United States Patent [19]

Etoh

[11] Patent Number: 4,757,450

[45] Date of Patent: Jul. 12, 1988

[54] METHOD AND SYSTEM FOR AUTOMATICALLY DETECTING A PRECEDING VEHICLE

[75] Inventor: Yoshiyuki Etoh, Yokosuka, Japan

[73] Assignee: Nissan Motor Company, Limited, Yokohama, Japan

[21] Appl. No.: 841,791

[22] Filed: Mar. 20, 1986

[30] Foreign Application Priority Data

Jun. 3, 1985 [JP] Japan .................................. 60-118893

[51] Int. Cl.⁴ ............................................. G06F 15/50
[52] U.S. Cl. ..................................... 364/426; 364/461; 342/70; 340/904; 180/169
[58] Field of Search ............... 364/424, 426, 460, 461, 364/456; 340/901–904; 180/167, 169, 170, 179; 342/70, 455

[56] References Cited

U.S. PATENT DOCUMENTS

| | | | |
|---|---|---|---|
| 4,072,945 | 2/1978 | Katsumata et al. | 342/70 |
| 4,101,888 | 7/1978 | Heller et al. | 342/70 |
| 4,148,028 | 4/1979 | Fujiki | 342/70 |
| 4,349,823 | 9/1982 | Tagami et al. | 342/455 |
| 4,519,469 | 5/1985 | Hayashi et al. | 342/70 |
| 4,543,577 | 9/1985 | Tachibana et al. | 342/70 |
| 4,552,456 | 11/1985 | Endo | 356/5 |
| 4,621,705 | 11/1986 | Etoh | 364/461 |
| 4,622,636 | 11/1986 | Tachibana | 342/70 |
| 4,670,845 | 6/1987 | Etoh | 364/461 |

FOREIGN PATENT DOCUMENTS

| | | |
|---|---|---|
| 3325713 | 1/1985 | Fed. Rep. of Germany . |
| 54-27140 | 3/1979 | Japan .................................. 342/70 |
| 2139445 | 11/1984 | United Kingdom . |

*Primary Examiner*—Gary Chin
*Attorney, Agent, or Firm*—Foley & Lardner, Schwartz, Jeffery, Schwaab, Mack, Blumenthal & Evans

[57] ABSTRACT

A method and system for detecting a presence of a preceding vehicle moving in a front detection area of a controlled vehicle. In the method and system thereof, a plurality of laser or other kinds of beams are transmitted to any object present in the front detection area and the plurality of reflected beams are received so that the respective distances to the reflecting objects are measured on the basis of the propagation delay times between the transmission and reception of the beams. In the method and system thereof, each absolute difference between the current value of distance measured by any one of the beams and any one of previous value of distance measured by the corresponding or another one of the beams before a predetermined time (corresponds to an interruption time of a processing routine) is calculated and compared to a predetermined distance value which is relatively small in order to determine that the preceding vehicle which has been detected by any one of the beams within the predetermined time is the same as that which is currently detected by any one of the beams. Therefore, the presence of the preceding vehicle can accurately be detected without mistaking the preceding vehicle for another vehicle moving on a different traffic lane or as a stationary object located at either side of a traffic lane. This is true even when the controlled vehicle and preceding vehicle move on a curve road. Vehicle speed can be controlled to track the real preceding vehicle.

16 Claims, 8 Drawing Sheets

METHOD AND SYSTEM FOR AUTOMATICALLY DETECTING A PRECEDING VEHICLE

BACKGROUND OF THE INVENTION

The present invention relates to a method and system in an automotive vehicle for automatically detecting a preceding vehicle which ensures continuous detection of the presence or absence of the preceding vehicle travelling in the same lane as the vehicle. The system and method according to the present invention is applicable to systems which automatically track a preceding vehicle at a safe intervehicle distance.

Recently, automatic cruising speed control systems have been installed on automotive vehicles for the purpose of maintaining the vehicle approximately at a set cruising speed without manual intervention. Furthermore, other automatic speed control system have been proposed which automatically track the preceding vehicle. This kind of vehicle speed control system controls the opening angle of the throttle valve installed within a throttle chamber in the engine of the vehicle so that the vehicle is maintained at an approximately constant speed or so that the intervehicle distance between the vehicle and a preceding vehicle is held approximately at a predetermined distance. This kind of vehicle speed control system is exemplified by laid-open, unexamined Japanese Patent Application No. Sho 55-86000.

Such vehicle speed control systems require accurate measurement of intervehicle distance from the vehicle to the preceding vehicle in order to carry out appropriate control of the vehicle speed. Therefore, systems have been proposed with radar units mounted on the vehicle in order to determine the intervehicle distance. Such radar units normally employ electromagnetic waves with high directivities, such as radio waves and lasers, as measurement media for accurate measurement of the intervehicle distances, assuming that the transmitted electromagnetic waves are reflected by the preceding vehicle. However, measurement of the intervehicle distance often is impossible, especially in cases where the vehicle is travelling on a curved road since such radar units cannot receive waves reflected by the preceding vehicle.

In addition, in this case, such radar units may erroneously detect forwarding vehicles travelling in adjacent lanes.

Another vehicle speed control system which ensures detection of the presence or absence of a preceding vehicle on a curved road and enables continuous measurement of the intervehicle distance has been proposed. The proposed vehicle speed control system is disclosed in a laid-open, examined Japanese Patent Application No. Sho 51-7892.

FIG. 1 conceptually shows the construction of the above-described vehicle speed control system which detects obstacles in front of the vehicle as disclosed in the above-identified Japanese documents.

In FIG. 1, a rotating unit 9 for rotating the radar unit 1 about a vertical axis is provided so that the radar unit 1 can pivot left and right according to the angular position of the vehicular steering wheel monitored by a steering angle sensor 5. That is to say, a signal processing circuit 7 in the vehicle speed control system shown in FIG. 1 ensures that the radar unit will always be pointing in the current direction of travel of the vehicle. This helps track any vehicles preceding the vehicle in the lane so as to facilitate measurement of the intervehicle distance, and control of the vehicle speed via a speed adjusting mechanism 11 independent of an usual accelerator pedal so as to maintain the intervehicle distance at a safe intervehicle distance on the basis of the measured distance and the vehicle speed detected by means of a vehicle speed sensor 3.

However, even this method of rotating the radar unit according to a steering angular position cannot fully ensure accurate tracking and measurement since the angular displacement of the steering wheel does not always coincide with the radius of curvature of the curved road. Consequently, a highly reliable detection of the presence or absence of the preceding vehicle cannot always be achieved.

The copending U.S. patent application by the same Applicant, namely, Ser. No. 739,152 filed on May 30, 1985 discloses a similar preceding vehicle detection system in which the steering angle sensor is provided to determine whether the current angular position of the steering wheel is within overlapping areas of any one of the plurality of angles of coverages of the individual laser beams, thus determining whether the preceding vehicle to be tracked by the vehicle moves on the straight road or curved road.

SUMMARY OF THE INVENTION

With the above-described problem in mind, it is an object of the present invention to provide a method and system for detecting, without fail, a preceding vehicle in the same traffic lane as the vehicle, and without use of a steering angle sensor.

This can be achieved by a method comprising the steps of:

(a) receiving respective values of distances from a controlled vehicle to wave reflecting objects present in a forward detection area to which the controlled vehicle is to move, toward which at least one wave having a predetermined angle of coverage is transmitted, and from which a plurality of beams are received in mutually different directions measured on the basis of respective propagation delay times between the transmission of the wave and reception of the reflected beams against the individual objects:

(b) fetching the respective values of distances from the controlled vehicle to the objects measured before a predetermined time;

(c) determining which one of the beams has captured a presence of one of the objects which is a preceding vehicle to be tracked by the controlled vehicle before the predetermined time according to a state of indicating means for indicating which beam has captured the presence of the preceding vehicle before the predetermined time;

(d) determining whether a first absolute difference between the current value of distance measured by means of a first beam received in a first direction and fetched in the step (a) and a previous value thereof before the predetermined time is below a predetermined value of distance when determining that the indicating means indicates that the first beam has captured the presence of the preceding vehicle before the predetermined time in the step (c);

(e) determining whether a second absolute difference between the current value of distance measured by means of a second beam received in a second direction adjacent to the first direction and the previous value of distance measured by means of the first beam before the predetermined time is below the predetermined value of distance when determining that the first absolute difference is not below the predetermined time in the step (d);

(f) setting the state of the indicating means depending on the determination that any one of the absolute differences is below the predetermined value of distance in the steps (d) and (e) and setting the current value of distance received in the step (a) and which satisfies the determination in either of the steps (d) and (e) as the distance value from the controlled vehicle to the preceding vehicle;

(g) controlling a speed of the controlled vehicle to track the preceding vehicle in accordance with the set value of distance in the step (f);

(h) storing the current respective values of distances received in the step (a); and (i) repeating the steps (a) through (h) over the predetermined time.

BRIEF DESCRIPTION OF THE DRAWINGS

A more complete understanding of the present invention may be obtained from the following detailed description taken in conjunction with the attached drawings in which.

DETAILED DESCRIPTION OF THE PREFERRED EMBODIMENTS

Reference will hereinafter be made to the drawings in order to facilitate understanding of the present invention.

Figure 1:
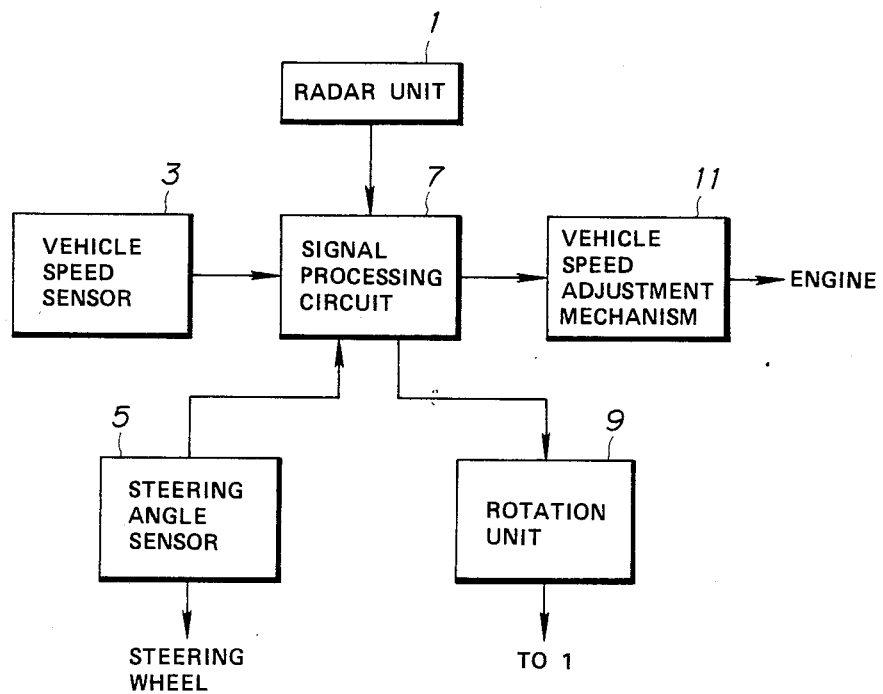
FIG. 1 is a functional block diagram of a vehicle speed control system disclosed in laid-open, examined, Japanese Patent Application No. Sho 51-7892.
Figure 2:
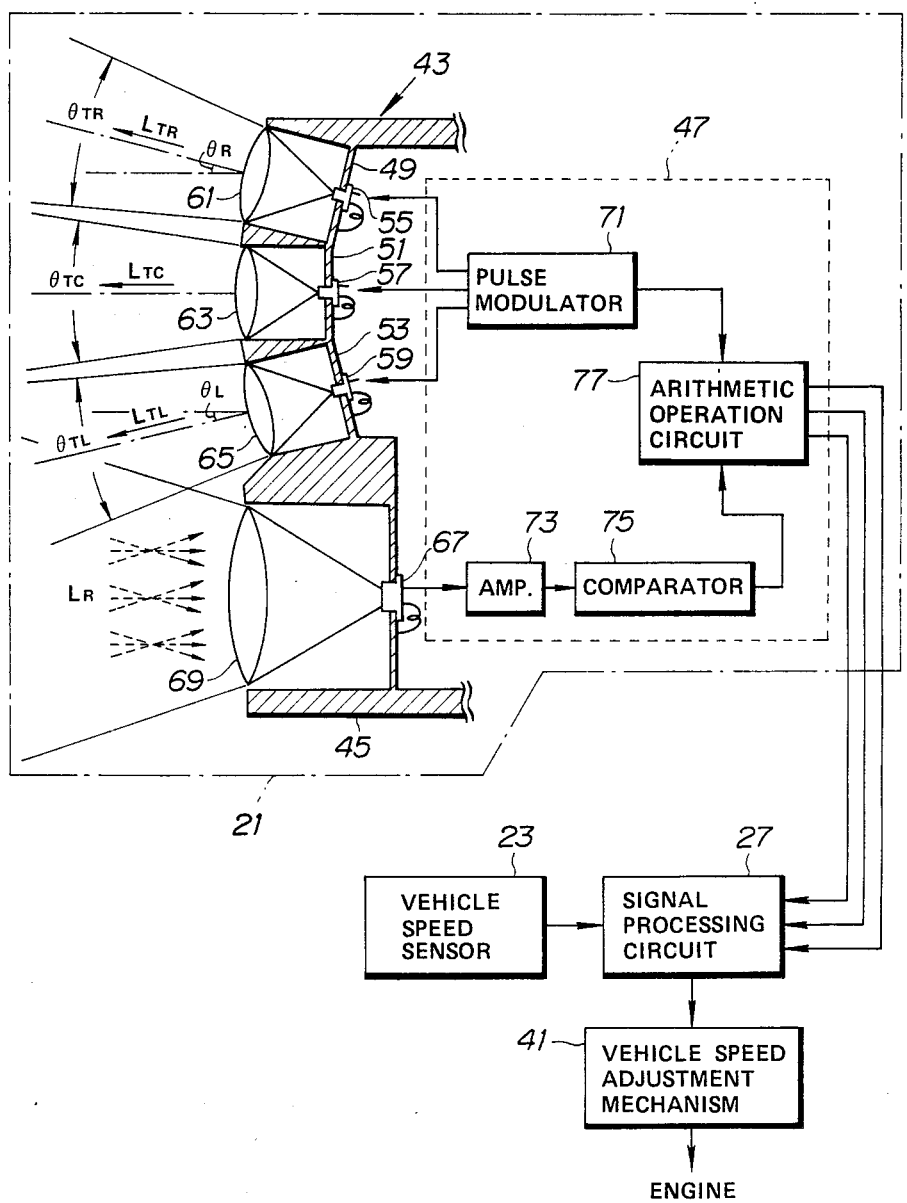
FIG. 2 is a circuit block diagram of the preferred embodiment of a system for detecting a preceding vehicle according to the present invention.

FIG. 2 shows a preferred embodiment according to the present invention.

The preceding vehicle detecting system includes a signal processing circuit 27 which receives output signals from a radar unit 21 and vehicle speed sensor 23, processes them as described later, and controls vehicle speed via a speed adjusting mechanism 41.

The radar unit 21 includes a light transmission section 43, a light receiving section 45, and a control section 47. The light transmission section 43 comprises a first light output unit 51 with its optical axis pointing straight ahead, orthogonal to the width of the vehicle, and second and third light output units 49, 53 having optical axes offset from the optical axis of the first light output unit 51 at respective right and left angles $\theta_R$, $\theta_L$ ($\theta_R = \theta_L$). In addition, each of the first, second, and third light output units 49, 51, and 53 includes a laser diode 55, 57, 59 and a lens 61, 63, 65. A laser beam generated by each laser diode 55, 57, 59 propagates toward a front detection area of the vehicle with an angular coverage of $\theta_{TR}$, $\theta_{TC}$, $\theta_{TL}$ ($\theta_{TR} = \theta_{TC} = \theta_{TL}$) and a light intensity of $L_{TR}$, $L_{TC}$, $L_{TL}$ ($L_{TR} = L_{TC} = L_{TL}$). Hence, laser light radiates symmetrically about the longitudinal axis and forward of the vehicle.

The light receiving section 45 captures transmitted laser light reflected by reflective objects. The light receiving section 45 comprises a light receiving element 67 and light collecting lens 69 which focuses light on the light-sensitive surface of the light receiving element. The control section 47 controls the transmission and reception of the lasers and measures the distance between vehicles-actually the distance and direction between the light transmission section 43 and the light reflecting object. The control section 47 comprises a pulse modulator 71, an amplifier 73, a comparator 75, and an arithmetic operation circuit 77. The pulse modulator 71 outputs a pulse modulated signal having a pulsewidth of approximately 100 nanoseconds and an oscillation frequency of several kilohertz sequentially to laser diodes 55, 57, 59 to activate these laser diodes 55, 57, 59. In addition, the pulse modulator 71 outputs signals indicating transmission timing to the arithmetic operation circuit 77 in synchronization with the aforementioned pulse-modulated signal. The amplifier 73 amplifies the received signals which are photo-electrically transduced from the light received by the light receiving element 67. The comparator 75 compares the level of the received signal from the amplifier 73 with a predetermined level in order to recognize when the received light exceeds the predetermined level and to output a reflection signal indicating same. The arithmetic operation circuit 77 determines the distance and direction of the reflective object described above on the basis of the time difference between the light transmission signal and the reflection signal.

The arithmetic operation circuit 77 calculates the above-described distance from the following equation:

DISTANCE: $l = c \times T/2$ wherein c denotes the speed of light (i.e., $3 \times 10^8$ meters per second) and T denotes the above-described input time difference.

The signal processing circuit 27 connected to the arithmetic operation circuit 77 comprises, e.g., a microcomputer, and carries out the vehicle speed control by means of the processing described below. The microcomputer usually includes a Central Processing Unit (CPU), a Random Access Memory (RAM), a Read-Only Memory (ROM), and an Input/Output (I/O) interface.

FIGS. 3(A), 3(B) and 3(C) together form a processing flowchart executed by the signal processing circuit 27.

Before the processing flowchart is described in detail, the theory of the processing flowchart will be described with reference to FIGS. 4 and 5.

Figure 3:
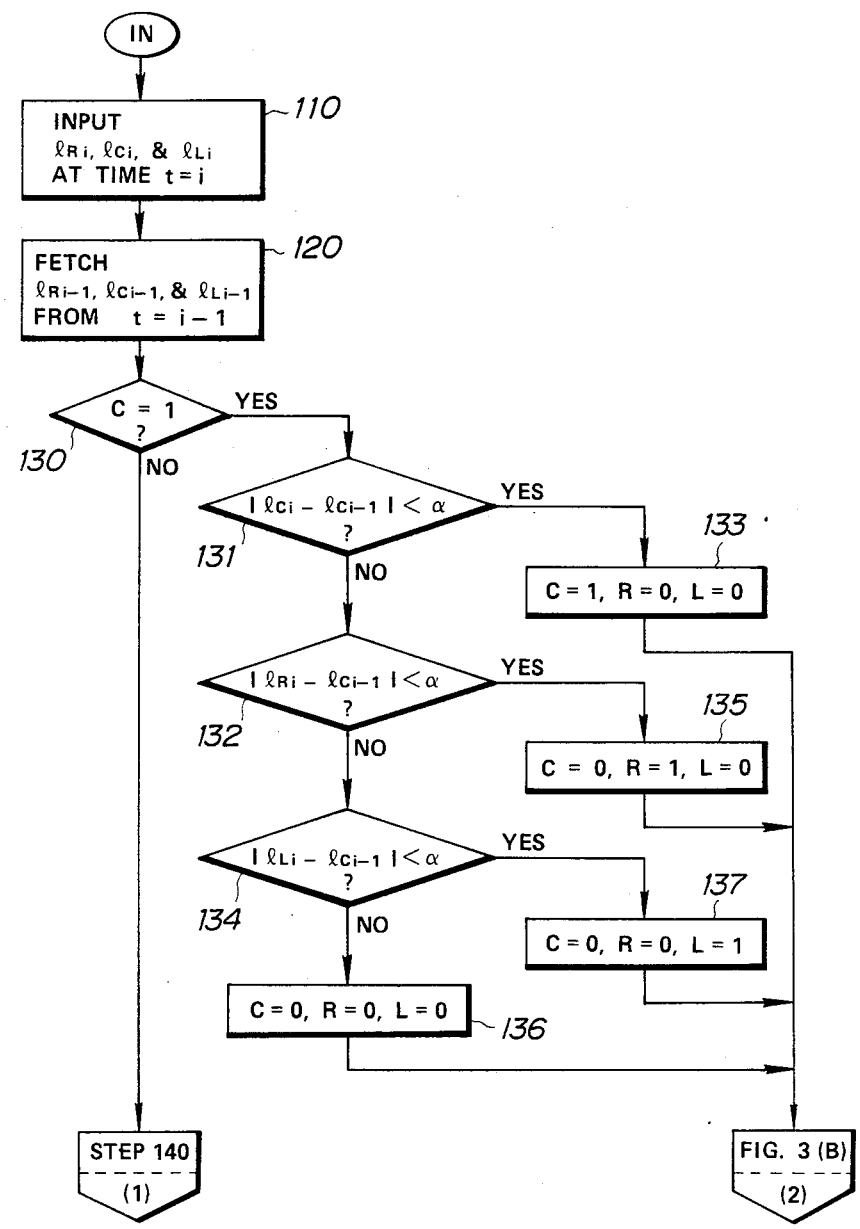
FIGS. 3(A) through (C) are integrally an operational flowchart of the preceding vehicle detection system shown in FIG. 2.
Figure 3:
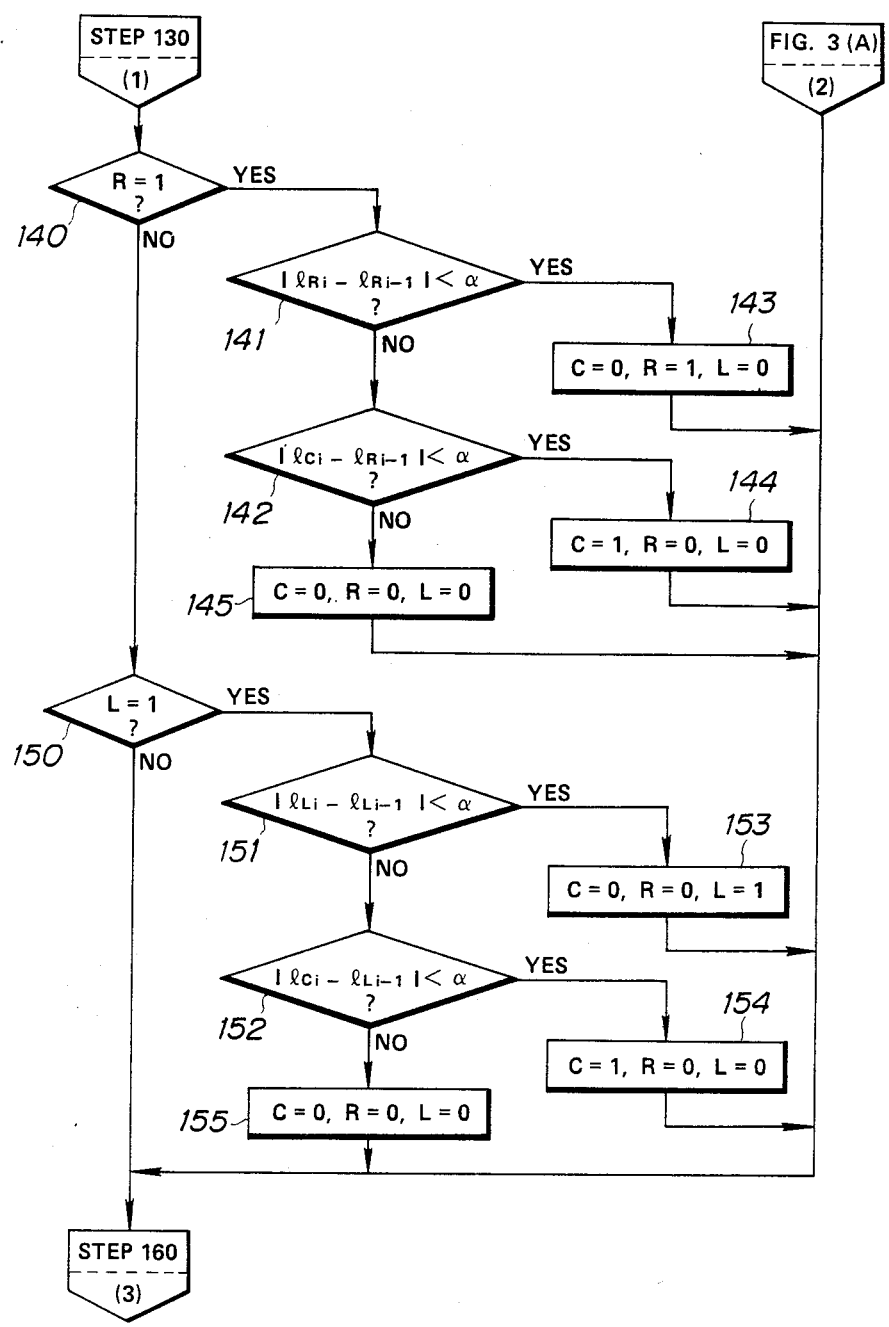
Figure 3:
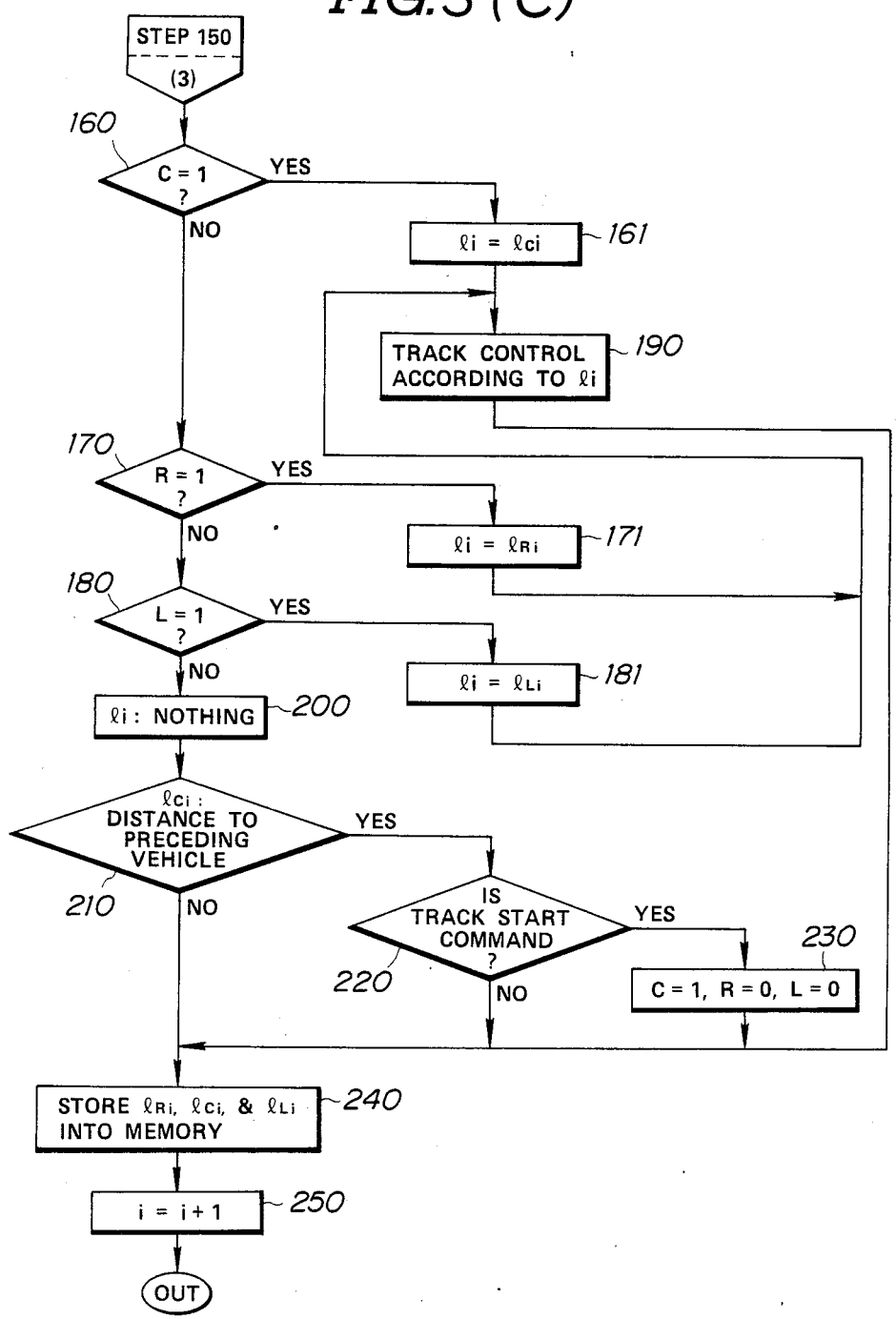

The processing flowchart shown in FIG. 3 is designed to detect and track only the preceding vehicle in the same traffic lane as the vehicle, and to ignore detection signals representing vehicles in adjacent traffic lanes, for example, even when the vehicle is travelling on a curved road on the basis of the distance signals l along each optical axis derived by the radar unit 21 described above.

In more detail, it is necessary to know which of the laser beams is currently pointed at the preceding vehicle. This is recognized on the basis of signals indicating the direction and distance to the preceding vehicle as measured by each of the center, right, and left laser beams driven from the first, second, and third light output units 51, 49, and 53. The distance measured along the central axis of the vehicle is labelled $l_{Ci}$, the distance along the right-offset axis is labelled $l_{Ri}$, and the distance along the left-offset axis is labelled $l_{Li}$, where i denotes the progress of time. On the basis of changes in these distance values, the signal processing circuit 27 controls flags in such a way that a center flag C is set to "1" when the preceding vehicle is detected by the center laser beam, a right flag R is set to "1" when the preceding vehicle is detected by the right laser beam, and a left flag L is set to "1" when the preceding vehicle is detected by the left laser beam. Since it is always known which one of the laser beams cover or track the preceding vehicle, the preceding vehicle can be tracked by the laser beams without mistake, even on curved roads.

In addition, suppose that a preceding vehicle moving along a straight road at a time $t_{i-1}$ is detected and tracked at a central-axis distance $l_{Ci-1}$, and then the preceding vehicle enters a right curve at a time $t_i$. The preceding vehicle would be detected by the right laser beam immediately before the preceding vehicle moves out of detection range of the center laser beam and the center laser beam thus loses the ability to track the preceding vehicle.

In this case, since the preceding vehicle is simply turning right along the curve, the value of the straight position distance $l_{Ci-1}$ detected by the center laser beam immediately before the time $t_{i-1}$ would hardly differ from the right-offset distance value $l_{Ri}$ detected by the right laser beam at the time $t_i$. That is to say, the value $l_{Ci-1}$ would be almost the same as the value $l_{Ri}$ so that the difference therebetween would be within a predetermined distance value $\alpha$. Therefore, if the value $l_{Ci-1}$ is compared to the value $l_{Ri}$ and they are substantially the same or the difference therebetween is within a predetermined distance $\alpha$, the preceding vehicle currently detected by the right laser beam can be recognized to be the same as that previously detected and tracked by the center laser beam.

That is to say, even though the preceding vehicle tracked in this way enters a curve so that its orientation with respect to the tracking vehicle changes so that it moves out of one detection area and into another, the preceding vehicle which has been tracked up to now can assuredly be identified by the degree of change in the distance detected by the two laser beams involved. Consequently, the preceding vehicle will not be lost and no other vehicle will be erroneously identified as the preceding vehicle.

Figure 4:
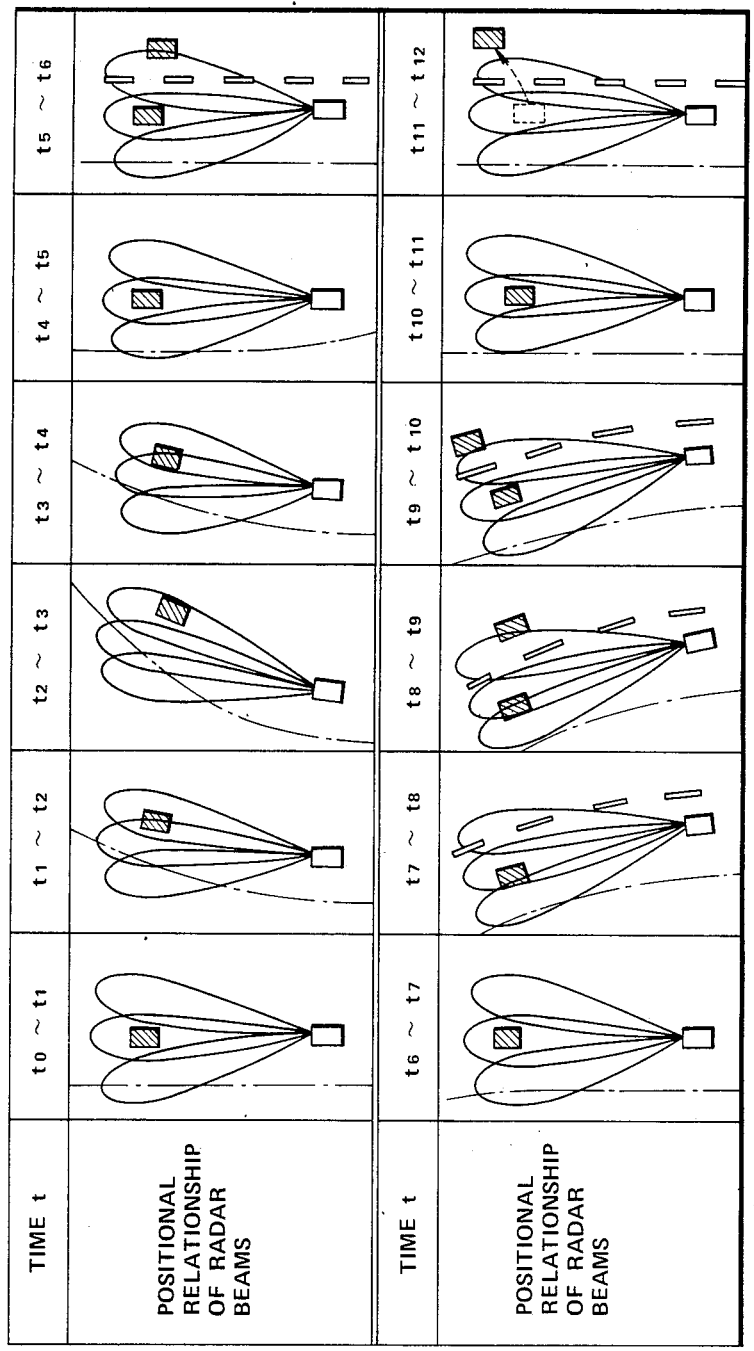
FIG. 4 is a diagram of specific situations in which the preceding vehicle is detected.

FIG. 4 shows a changing relationship among the detection ranges of the laser beam and the preceding vehicle as the vehicle travel along pass a straight load, through a right curve, then a straight stretch of road, then a left curve, and finally another straight stretch. The preceding vehicles are denoted by oblique lines enclosed within a rectangle and the tracking vehicle is denoted by an empty rectangle.

Figure 5:
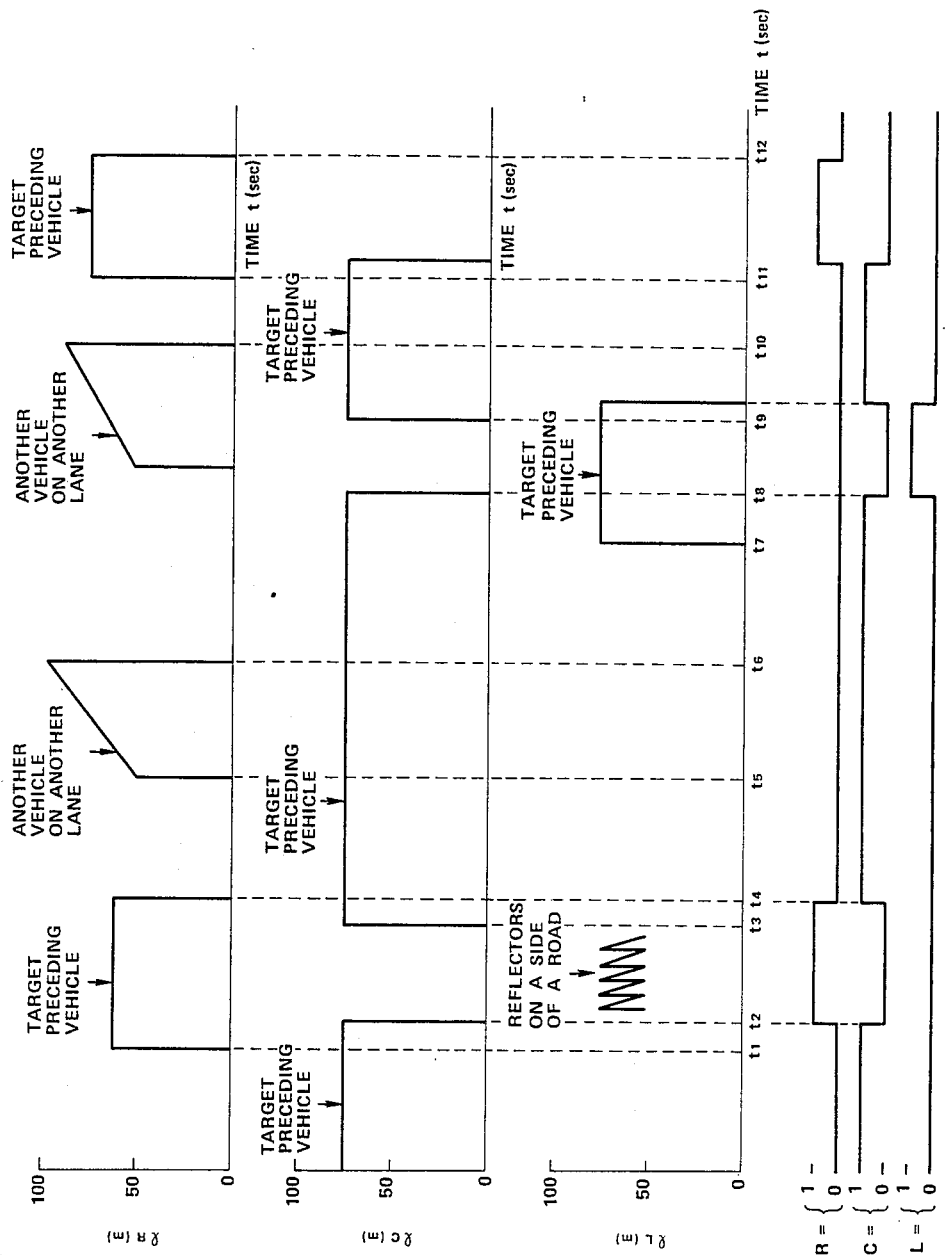
FIG. 5 is a timing chart of output signals of major circuits shown in FIG. 2 for the situations shown in FIG. 4.

FIG. 5 shows direction and distance signals for the preceding vehicle detected by the radar unit 21 over the series of changes shown in FIG. 4, specifically central-axis distance value $l_C$, right-offset distance value $l_R$, left-offset distance value $l_L$, and the values of the center flag C, right flag R, and left flag L over the time frames from $t_1$ to $t_{12}$.

The processing flowchart shown in FIGS. 3(A) through 3(C) enables accurate detection of the preceding vehicle which the controlled vehicle tracks.

As appreciated from FIGS. 4 and 5, when a preceding vehicle is within the detection range of the center laser beam and detected by the center laser beam while moving down a straight road, the value of the straight-position distance $l_C$ will represent the intervehicle distance and the center flag C will be set to "1". When the vehicle (and the preceding vehicle) enter a right-hand curve, the preceding vehicle will come within detection range of the right laser beam and so be detected by the right laser beam. The value of the right-offset distance $l_R$ will then represent the intervehicle distance and the right flag R will be set to "1".

When the vehicle (and preceding vehicle) enter a left-hand curve the preceding vehicle will come within detection range of the left laser beam. The value of the left-offset distance $l_L$ will then represent the intervehicle distance and the left flag L will be set to "1".

In addition, the direction and distance signals $l_C$, $l_R$, $l_L$ representing the intervehicle distance can be used in control systems designed to hold the intervehicle distance to a same level determined by the vehicle speed.

The processing flowchart shown in FIG. 3 will be described with reference to FIG. 4 and FIG. 5.

The processing flowchart of FIG. 3 is executed periodically, e.g., every several tens of microseconds representing an interrupt period of the microcomputer making up the signal processing circuit 37 (refer to FIG. 2).

In a step 110, the circuit 27 reads in the current time t=i values of the right-offset distance $l_{Ri}$, the central-axis distance $l_{Ci}$, and the left-offset distance $l_{Li}$ from the radar unit 21.

In a step 120, the circuit 27 retrieves previously stored values of the right-offset distance $l_{Ri-1}$, the central-axis distance $l_{Ci-1}$, and the left-offset distance $l_{Li-1}$ which were read and stored in memory in the immediately preceding execution cycle (i.e., t=i−1). Thereafter, the processing routine is divided into four processing paths: (a) a first processing path for preceding vehicles detected by the center laser beam (steps 130 through 137); (b) a second processing path for forwarding vehicles detected by the right laser beam (steps 140 through 145); (c) a third processing path for forwarding vehicles detected by the left laser beam (steps 150 through 155); and (d) a fourth processing path in which the intervehicle distance $l_i$ to the tracked target preceding vehicle is set and values of the right-offset distance $l_{Ri}$, central-axis distance $l_{Ci}$, and left-offset distance $l_{Li}$ are stored in the memory (steps 160 through 250).

First, in the first processing path represented by the steps 130 through 137, the circuit 27 determines whether the center flag C is set to "1" in the step 130 in order to determine whether the preceding vehicle is detected solely by the center laser beam. If not, control passes to the second path at step 140.

At the times between $t_0$ and $t_1$, $t_4$ and $t_7$, and $t_{10}$ and $t_{11}$ in FIGS. 4 and 5, the preceding vehicle falls solely within the detection area of the central laser.

The preceding vehicle may turn right upon encountering a right-hand curve road, e.g. as at time $t_1$ in FIG. 4, turn left or go straight. The circuit 27 recognizes the behavior of the preceding vehicle on the basis of the direction and direction signals described above. One of the flags R, L, or C will be set according to the direction signals to indicate in which direction, if any, the preceding vehicle is turning. If should be noted that only one of the flags R, L or C is set at a time and that the flags R and L have precedence over flag C.

If the center flag C is set to "1" in the step 130, the routine goes to the step 131 in which an absolute difference between the current value of distance detected by the center beam $l_{Ci}$ in the step 110 at the time $t_i$ and previous value of distance $l_{Ci-1}$ stored in the memory in the step 120 is calculated and compared to a predetermined distance $\alpha$ in order to determine whether the preceding vehicle tracked by the controlled vehicle at the previous same processing routine continues to move straight on the straight road or is turning left-hand curve or right-hand curve.

It should be noted that the value of the predetermined distance $\alpha$ is relatively small as described above and specifically the value $\alpha$ corresponds to the maximum change in the intervehicle distance over the execution period of the processing routine shown in FIGS. 3(A) through 3(C), e.g., over several tens of microseconds plus a small margin of error. Since the measuring accuracy of the radar unit 21 is ±1 meter then assuming a change in intervehicle distance within one meter, the predetermined distance value $\alpha$ may be selected to be approximately four meters.

If the calculated difference falls within the predetermined value of distance $\alpha$ in the step 131, the circuit 27 recognizes that the preceding vehicle detected by the center laser beam is the same preceding vehicle detected previously by the center laser beam. Then the routine goes to the step 133, in which only the center flag is set to "1" (C=1, R=0, L=0). If $|l_{Ci}-l_{Ci-1}| \geq \alpha$ (No) in the step 131, the routine goes to the step 132 since the preceding vehicle has disappeared out of the detection range of the center laser beam. In the step 132, an absolute difference between the current right-offset distance value $l_{Ri}$ and previous center-offset distance value $l_{Ci-1}$ is calculated and the calculated difference is compared to the predetermined distance $\alpha$.

In cases where the preceding vehicle is turning the right-hand curve at time $t_i$ from the straight road, for example, at times between $t_1$ and $t_2$, times between $t_2$ and $t_3$, and times between $t_3$ and $t_4$ shown in FIG. 4, the absolute difference between the values $l_{Ri}-l_{Ci-1}$ is below the predetermined value $\alpha$. Therefore, the routine goes to the step 135, in which the right flag R is set to "1" (C=0, R=1, L=0).

If $|l_{Ri}-l_{Ci-1}| \geq \alpha$ (No) in the step 132, it may be determined that the preceding vehicle has turned toward a left-hand curve, for example, at the time $t_8$ shown in FIG. 4 and the routine goes to the step 134. In the step 134, the absolute difference between the current value of distance detected by the left laser beam inputted at the step 110 $l_{Li}$ and previous value of distance detected by the center beam $l_{Ci-1}$ fetched in the step 120 is calculated and compared to the predetermined value $\alpha$. If $|l_{Li}-l_{Ci-1}| < \alpha$ in the step 134, the circuit 27 recognizes that the preceding vehicle has turned toward a left-hand curve from the straight position, for example, at times between $t_7$ and $t_8$ and identifies that the preceding vehicle which has been detected only by the center laser beam is currently detected by the left laser beam. Then the routine goes to the step 137, in which the left flag L is set to "1" (C=0, R=0, L=1).

If $|l_{Li}-l_{Ci-1}| \geq \alpha$ (No) in the step 134, the routine goes to the step 136, in which all flags C, R, and L are reset to "0" (C=0, R=0, L=0), since the preceding vehicle has moved to another traffic lane and cannot be detected any more by any laser beam, for example, at the time $t_{12}$ shown in FIG. 4.

After each flag C, R, and L is set or reset in each of the steps 133, 135, 136, and 137, the routine goes to a step 160 to be described later.

If the center flag C is equal to "0" when checked at the step 130, the circuit 27 checks to see whether the right flag R equals "1" in the step 140. This would mean that the preceding vehicle has been turning right and has been detected only by the right laser beam at the previous processing routine. This case occurs at times between $t_2$ and $t_3$, and between $t_{11}$ and $t_{12}$ in FIGS. 4 and 5, when the preceding vehicle returns from a curve to a straight stretch of road or continues through a right-hand curve.

If the right flag R equals "1", the absolute difference between the current right-offset distance $l_{Ri}$ and previous right-offset distance $l_{Ri-1}$ is calculated to determine whether the calculated absolute difference falls within the predetermined distance $\alpha$ in step 141 in order to determine whether the preceding vehicle, which was turning right previously, continues to turn along the right-hand curve, for example, at times between $t_2$ and $t_3$. If in the step 141, the calculated difference ($|l_{Ri}-l_{Ri-1}|$) falls within the predetermined distance value $\alpha$, the circuit 27 determines that the preceding vehicle is still detected by the right laser beam and is continuously turning the right-hand curve and the routine goes to the step 143, in which the right flag R is set to "1" (C=0, R=1, L=0). If $|l_{Ri}-l_{Ri-1}| \geq \alpha$ in the step 141, the circuit 27 determines that the preceding vehicle which was detected only by the right laser beam at the previous processing routine has disappeared out of the detection range of the right beam, i.e., has returned to the straight movement or has moved to a right-hand traffic lane during the right turn and out of the detection range of the right laser beam. Then, the routine goes to the step 142.

In the step 142, the absolute difference between the current value of distance detected by the center laser beam $l_{Ci}$ and the previous value of distance $l_{Ri-1}$ detected by the right laser beam at the previous processing routine is calculated and compared to the predetermined distance value $\alpha$. If $|l_{Ci}-l_{Ri-1}| < \alpha$ in the step 142, the routine goes to the step 144, in which the center flag C is set to "1" (C=1, R=0, L=0). That is to say, the circuit 27 determines that the preceding vehicle which has been detected by the right laser beam is the same as that detected by the center laser beam. If $|l_{Ci}-l_{Ri-1}| \geq \alpha$ in the step 142, the circuit 27 determines that the preceding vehicle which has been detected by the right laser beam has disappeared out of the detection range of the right laser beam, i.e., right-hand traffic lane since the value of $l_{Ci}$ becomes infinite. Then the routine goes to the step 145, in which all flags C, R, and L are reset (C=0, R=0, L=0). After each flag is set or reset in each step 143, 144, and 145, the routine goes to the step 160 to be described later.

In addition, in cases where the difference between the right-offset distance values $l_{Ri}$ and $l_{Ri-1}$ is within the predetermined distance $\alpha$, the preceding vehicle may not be exiting a right-hand curve.

If the left flag L is set to a "1" in a step 150, the routine goes to a step 151, in which the absolute difference between the current and previous values ($|l_{Li}-l_{Li-1}|$) is compared with the predetermined value $\alpha$ to determine whether the preceding vehicle which has been turning on the left-hand curve at the time $t_{i-1}$, e.g. $t_9$, is returning to the straight road or the preceding vehicle continues to move on the left-hand curve. If $|1_{Li}-1_{Li-1}|<\alpha$ in the step 151, the routine goes to the step 153, in which the left flag L is set to "1" (C=0, R=0, L=1), since the circuit determines that the preceding vehicle which has been detected by the left laser beam at the previous processing routine is continuously turning along a left-hand curve and is detected by the left laser beam. On the other hand, if $|1_{Li}-1_{Li-1}|\geq\alpha$ in the step 151 (No), the routine goes to the step 152 to determine whether the preceding vehicle which has been detected by the left beam has now returned to a straight movement or has disappeared out of the detection range of the left beam, i.e., moved to a left-hand traffic lane. In the step 152, the absolute difference between the current value $1_{Ci}$ an previous value of distance $1_{Li-1}$ is calculated and compared to the predetermined distance value $\alpha$. If $|1_{Ci}-1_{Li-1}|<\alpha$ (Yes) in the step 152, the circuit 27 determines that the preceding vehicle which has been detected by the left laser beam is currently detected by the center beam, i.e., is returned to the straight movement. Then the routine goes to the step 154, in which only the center flag C is set (C=1, R=0, L=0). If $|1_{Ci}-1_{Li-1}|\geq\alpha$ (No)in the step 152, the circuit 27 determines that the preceding vehicle which has been detected by the left laser beam is now moved to the left-hand traffic lane, i.e., out of the detection range of the left laser beam. Then the routine goes to the step 155, in which all flags are reset (C=0, R=0, L=0). After each flag is set or reset in each step 153, 154, the routine goes to the step 160.

In this way, after the target preceding vehicle is accurately detected by means of first, second, and third processing flows of steps 130 through 155 and the preceding vehicle is tracked with any one of the laser beams being identified by any one of the three flags, C, R, and L, the routine goes to the fourth processing flow subsequent the step 160 in which the intervehicle distance 1 to the target preceding vehicle is set and the values of the right-offset distance $1_{Ri}$, central-axis distance $1_{Ci}$, and left-offset distance $1_{Li}$ are stored in the memory.

That is to say, in the steps 160, 170, 180, the circuit 27 determines any one of which the flags C, R, or L is currently set to "1" from the above-described first, second, and third processing flows.

If any one of the three flags C, R, and L is set to "1" (Yes) in the steps 160, 170, and 180, the routine goes to each step 161, 171, and 181, in which each corresponding distance value $1_{Ci}$, $1_{Ri}$, and $1_{Li}$ to the flag is set as the intervehicle distance value to the preceding vehicle $1_i$.

In the next step 190, the circuit 27 operates to control the controlled vehicle to follow the preceding vehicle according to the set intervehicle distance $1_i$. Then the routine goes to the step 240, in which the right-offset distance value $1_{Ri}$ central-axis distance value $1_{Ci}$, and left-offset distance value $1_{Li}$ are stored in the corresponding area of the memory. Then, in the step 250, the suffix i is incremented as $i=i+1$ and the present processing flow is ended. If no flag is set, the routine goes to steps 210, 220, and 230 via the step 200 from the steps 160, 170, and 180. In the steps 210, 220, and 230, the circuit 27 carries out a selection of a preceding vehicle which is to be the next target. In detail, in the step 210, the circuit 27 determines whether the central-axis distance value $1_{Ci}$ is a distance from a real preceding vehicle or from a stationary object located on either side of the road on the basis of the change of the front-direction distance values $1_{Ci-4}$, $1_{Ci-3}$, $1_{Ci-2}$, $1_{Ci-1}$, . . . with respect to time using, for example, a method disclosed in a U.S. patent application Ser. No. 660,958 filed on Oct. 15, 1984. Therefore, the disclosed contents of the U.S. patent application Ser. No. 660,958 is hereby incorporated by reference. If the central-axis distance value $1_{Ci}$ indicates the distance to a preceding vehicle, as opposed to a stationary object in the step 210, the circuit 27 issues a speed control command to track the detected preceding vehicle in the step 220, and then each flag is set as follows: center flag C=1; right flag R=0; and left flag L=0 in the step 230. Then, the values of the right-offset distance $1_{Ri}$, straightly forward (central-axis) distance $1_{Ci}$, and left-offset distance $1_{Li}$ read in the step 110 are stored in predetermined areas of the memory in the step 240. Finally, the suffix i of the interruption time is incremented as i+1 in the step 250 and the present processing flow is ended.

On the other hand, if the distance value does not indicate the distance to the preceding vehicle in the step 210, the routine goes directly to the step 240. The memory then receives and stores in the predetermined locations the values of the right-offset distance $1_{Ri}$, forward (central axis) distance $1_{Ci}$, and left-offset distance value $1_{Li}$ in the step 240. Then, the suffix i indicating the interruption time is incremented as i+1 in the step 250, thereby ending the processing flow.

Figure 6:
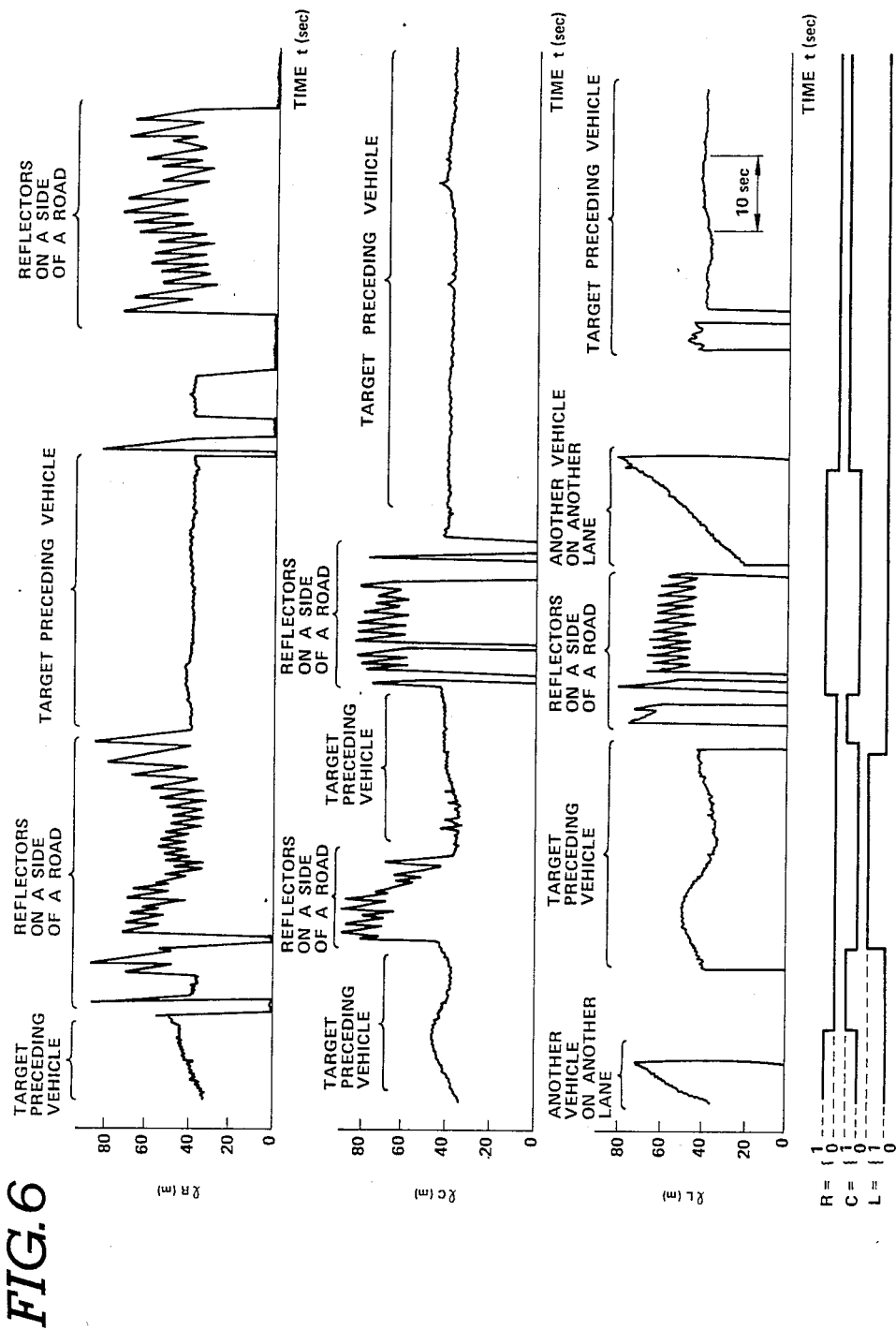
FIG. 6 is a timing chart corresponding to FIG. 5 of experimental output signals of the major circuits shown in FIG. 2 in a case where the vehicle on which the preceding vehicle detection system shown in FIG. 2 is mounted actually travels along a freeway.

FIG. 6 shows experimental data on the values of the right-offset distance $1_R$, central-axis (central axis) distance $1_C$, and left-offset distance $1_L$ and each flag C, R, and L shown in FIG. 5 when the vehicle on which the system in the preferred embodiment is mounted moves on a free way. As appreciated from FIG. 6, the experimental data coincides with the theoretical operation shown in FIG. 5.

It should be noted that although in the above-described embodiment the number of laser beams are three, other numbers of laser beams, e.g., 2, 4, 5, or etc. may be selected. Therefore, the detection capability is increased according to the increase in the number of laser beams.

In addition, although the plurality of light output units and a single light receiving unit are installed in the above-described preferred embodiment, the light output unit may be a single unit having a high power output and a wide angle of coverage and a plurality of light receiving units may be used having different light-receiving sight characteristics in the horizontal direction.

Furthermore, detection means for detecting the distances of the plurality of receiving pulses within a certain beam may be utilized to increase the detection effect. Although in the above-described embodiment the radar system using laser beams is described, another radar or sonar system using electromagnetic wave or ultrasonic wave may be used.

As described hereinabove, the vehicle speed control system according to the present invention included as means for transmitting the electromagnetic waves such as laser beams in different directions toward the front preceding vehicle detection areas and provides means for identifying that the reflecting object is a preceding vehicle travelling on the same traffic lane. Such detection is made on the basis of the direction and distance of the object from one of the reflected waves of the reflecting objects. In cases when the tracking preceding vehicle detected in a first direction cannot be detected within the predetermined change in distance with respect to the vehicle, the preceding vehicle detected in a second direction is determined as the preceding vehicle to be tracked from the relationship between the distance to the tracked preceding vehicle detected in the first direction and the preceding vehicle detected in the second direction. Therefore, even when tracked preceding vehicle, e.g., has entered a curved road from the straight road and is out of the range detected in the first direction, the tracked preceding vehicle can be detected without fail, and only the preceding vehicle which moves on the same traffic lane as the vehicle is detected. When the system according to the present invention is applied to the intervehicle distance control system, the system can detect without error whether the preceding vehicle is moving on the same traffic lane or other vehicle is moving on another traffic lane. Especially on a curved road, the system can detect the correct intervehicle distance to the preceding vehicle. Consequently, a safe automatic driving can be achieved. Since plural means are provided for transmitting electromagnetic waves are installed to direct the waves in different transmission directions, it is not necessary to rotate the transmitting means to direct the waves in the different directions according to the steering movement of the vehicle, and thus a reliable system can be achieved without great expenditures.

It will clearly be appreciated by those skilled in the art that the foregoing description is made in terms of the preferred embodiment and various changes and modifications may be made without departing from the scope of the present invention which is to be defined by the appended claims.

What is claimed is:

1. Apparatus for controlling the speed of a controlled vehicle to maintain a predetermined distance to a preceding vehicle identified as a target vehicle comprising:
    (a) means for determining the speed of said controlled vehicle,
    (b) a control vehicle speed adjustment mechanism responsive to a control signal for controlling the speed of said controlled vehicle,
    (c) transmitter means for generating transmitted waves toward a predetermined region preceding said controlled vehicle,
    (d) means for receiving waves reflected from objects in said predetermined region,
    (e) said predetermined region divided into at least a first and second adjacent regions and at least one of (1) said transmitter means transmitting separately defined transmitting waves into each of said first and second adjacent regions and (2) said receiver means having at least first and second aperture characteristics so as to distinguish waves reflected from each of said first and second adjacent regions,
    (f) means, operative when said preceding vehicle is in said first region, for periodically calculating a distance between said preceding vehicle and said controlled vehicle based on a measured travel time between the generation of said transmitted waves and the receipt, in said receiving means, of said reflected waves, said distance defined by $l_{1i}$ for the most recent calculation at time $t_i$ and $l_{1i-1}$ for the immediately preceding calculation at time $t_{i-1}$,
    (g) means, operative when said preceding vehicle is in said second region, for periodically calculating a distance between said preceding vehicle and said controlled vehicle based on a measured travel time between the generation of said transmitted waves and the receipt, in said receiving means, of said reflected waves, said distance defined by $l_{2i}$ for the most recent calculation at time $t_i$ and $l_{2i-1}$ for the immediately preceding calculation at time $t_{i-1}$,
    (h) means for storing the distances $l_{1i-1}$ and $l_{2i-1}$,
    (i) means operative after said preceding vehicle is in said first region during time $t_{i-1}$ for determining if $|l_{1i} - l_{1i-1}| < \alpha$, where $\alpha$ is a predetermined constant and, if the unequality is true, for identifying said preceding vehicle as a target vehicle and as being in said first region at time $t_i$ and for generating said control signal based on $l_{1i}$ and said determined controlled vehicle speed, and
    (j) means, operative if $|l_{1i} - l_{1i-1}| \geq \alpha$ for determining if $|l_{2i} - l_{1i-1}| < \alpha$ and if $|l_{2i} - l_{1i-1}| < \alpha$ identifying said preceding vehicle as being in said second region at time $t_i$ and as said target vehicle and for generating said control signal based on $l_{2i}$ and said determined controlled vehicle speed.

2. Apparatus as recited in claim 1 wherein said transmitting means generates transmitted waves in each of said first and second regions at different times.

3. Apparatus as recited in claim 2 wherein said first region corresponds to a central region directly ahead of said controlled vehicle and said second region corresponds to one of a left or right region adjacent said central region, whereby said preceding vehicle is identified as said target vehicle even while said target vehicle is making a left or right turn.

4. Apparatus as recited in claim 1 further including means, operative after said preceding vehicle is in said second region during time $t_{i-1}$ for determining if $|l_{2i} - l_{2i-1}| < \alpha$, and, if true, for identifying said preceding vehicle as said target vehicle and as remaining in said second region at time $t_i$ and for generating said control signal based on $l_{2i}$ and said determined control vehicle speed.

5. Apparatus as recited in claim 4 further including means, operative if $|l_{2i} - l_{2i-1}| \geq \alpha$ for determining if $|l_{1i} - l_{2i-1}| \geq \alpha$, and if true, identifying said preceding vehicle as being in said first region at time $t_i$ and as said target vehicle and for generating said control signal based on $l_{1i}$ and said determined controlled vehicle speed, whereby said target vehicle is identified as moving from said second region to said first region.

6. Apparatus as recited in claim 5 wherein said transmitter means includes first and second transmitters for transmitting waves at different times into said respective first and second regions.

7. Apparatus as recited in claim 6 wherein said receiving means includes a single receiver receiving reflected waves at different times from said first and second regions.

8. Apparatus as recited in claim 1 wherein said predetermined region includes a third region, said first region defined centrally of said controlled vehicle, said second region defined to the right of said first region relative to the forward moving direction of said controlled vehicle and said third region defined to the left of said first region, and wherein said apparatus further comprises:
    (a) means, operative when said preceding vehicle is in said third region, for periodically calculating a distance between said preceding vehicle and said controlled vehicle based on a measured travel time between the generation of said transmitted waves and the receipt, in said receiving means, of said reflected waves, said distance defined by $l_{3i}$ for the most recent calculation at time $t_i$ and $l_{3i-1}$ for the immediately preceding calculation at time $t_{i-1}$, (b) means for storing $l_{3i-1}$, (c) means operative after said preceding vehicle is in said third region during time $t_{i-1}$ for determining $|l_{3i} - l_{3i-1}| < \alpha$, and if the unequality is true, for identifying said preceding vehicle as said target vehicle and as remaining in said third region at time $t_i$ and for generating said control signal based on $l_i$ and said determined controlled vehicle speed.

9. Apparatus as recited in claim 8 further including means, operative if $|l_{3i} - l_{3i-1}| \geq \alpha$, for determining if $|l_{1i} - l_{3i-1}| < \alpha$, and if true, identifying said preceding vehicle as being in said first region at time $t_i$ and as said target vehicle and for generating said control signal based on $l_{1i}$ and said predetermined controlled vehicle speed, whereby said target vehicle is identified as moving from said third region to said first region.

10. A method for controlling the speed of a controlled vehicle to maintain a predetermined distance to a preceding vehicle identified as a target vehicle comprising the steps of:

(a) determining the speed of said controlled vehicle, (b) controlling the speed of said controlled vehicle in response to a control signal, (c) generating transmitted waves toward a predetermined region preceding said controlled vehicle, (d) receiving waves reflected from objects in said predetermined region, (e) dividing said predetermined region into at least a first and second adjacent regions and at least one of (1) transmitting separately defined transmitting waves into each of said first and second adjacent regions and (2) distinguishing the received reflected waves in a receiver as emanating from said first or second adjacent regions on the basis of aperture characteristics of said receiver, (f) when said preceding vehicle is in said first region, periodically calculating a distance between said preceding vehicle and said controlled vehicle based on a measured travel time between the generation of said transmitted waves and the receipt, in said receiver, of said reflected waves, said distance defined by $l_{1i}$ for the most recent calculation at time $t_i$ and $l_{1i-1}$ for the immediately preceding calculation at time $t_{i-1}$, (g) when said preceding vehicle is in said second region, periodically calculating a distance between said preceding vehicle and said controlled vehicle based on a measured travel time between the generation of said transmitted waves and the receipt, in said receiver, of said reflected waves, said distance defined by $l_{2i}$ for the most recent calculation at time $t_i$ and $l_{2i-1}$ for the immediately preceding calculation at time $t_{i-1}$, (h) storing said distances $l_{1i-1}$ and $l_{2i-1}$, (i) after said preceding vehicle is in said first region during time $t_{i-1}$, determing if $|l_{1i} - l_{1i-1}| < \alpha$ where $\alpha$ is a predetermined constant and, if the unequality if true, identifying said preceding vehicle as a target vehicle and as being in said first region at time $t_i$ and generating said control signal based on $l_{1i}$ and said determined controlled vehicle speed, (j) if $|l_{1i} - l_{1i-1}| \geq \alpha$, determining if $|l_{2i} - l_{1i-1}| < \alpha$ and if $|l_{2i} - l_{1i-1}| < \alpha$ identifying said preceding vehicle as being in said second region at time $t_i$ and as said target vehicle and generating said control signal based on $l_{2i}$ and said controlled vehicle speed.

11. A method as recited in claim 10 wherein the step of generating transmitted waves includes the step of generating transmitted waves at different times in each of said first and second regions.

12. A method as recited in claim 11 wherein said first region corresponds to a central region directly ahead of said controlled vehicle and said second region corresponds to a left or right region adjacent said central region, whereby said preceding vehicle is identified as said target vehicle even while said target vehicle is making a left or right turn.

13. A method as recited in claim 10 further including the steps of:

after said preceding vehicle is in said second region during time $t_{i-1}$ determining if $|l_{2i} - |l_{2i-1}| < \alpha$ and, if true, identifying said preceding vehicle as said target vehicle and as remaining in said second region and generating said control signal based on $l_{2i}$.

14. A method as recited in claim 13 further including the steps of:

if $|l_{2i} - l_{2i-1}| \geq \alpha$, determining if $|l_{1i} - l_{2i-1}| < \alpha$, and, if true, identifying said preceding vehicle as being in said first region at time $t_i$ and as said target vehicle and generating said control signal based on $l_{1i}$ and said determined controlled vehicle speed, whereby said target vehicle is identified as moving from said second region to said first region.

15. A method as recited in claim 10 wherein said predetermined region includes a third region, said first region defined centrally of said controlled vehicle, said second region defined to the right of said first region relative to the forward moving direction of said controlled vehicle and said third region defined to the left of said first region, and wherein said apparatus further comprises the steps of:

(a) when said preceding vehicle is in said third region periodically calculating a distance between said preceding vehicle and said controlled vehicle based on a measured travel time between the generation of said transmitted waves and the receipt, in said receiver, of said reflected waves, said distance defined by $l_{3i}$ for the most recent calculation at time $t_i$ and $l_{3i-1}$ for the immediately preceding calculation at time $t_{i-1}$, (b) storing $l_{3i-1}$, (c) after said preceding vehicle is in said third region during time $t_{i-1}$, determining $|l_{3i} - l_{3i-i}| < \alpha$, and if the unequality is true, identifying said preceding vehicle as said target vehicle and as remaining in said third region at a time $t_i$ and generating said control signal based on $l_{31}$ and said determined controlled vehicle speed.

16. A method as recited in claim 15 further including the steps of:

if $|l_{3i} - l_{3i-1}| \geq \alpha$, determining if $|l_{1i} - l_{3i-1}| < \alpha$ and, if true, identifying said preceding vehicle as being in said first region at time $t_i$ and as said target vehicle and generating said control signal based on $l_{1i}$ and said determined controlled vehicle speed, whereby said target vehicle is identified as moving from said third region to said first region.

* * * * *